United States Patent Office 3,470,224
Patented Sept. 30, 1969

3,470,224
PROCESS FOR THE PREPARATION OF NEW DIALKYL ALUMINUM-AROMATIC COMPLEX COMPOUNDS
Herbert Lehmkuhl, Mulheim (Ruhr), Germany, assignor to Studiengesellschaft Kohle m.b.H., Mulheim (Ruhr), Germany
No Drawing. Filed June 22, 1966, Ser. No. 559,394
Claims priority, application Germany, July 5, 1965, St 24,085
Int. Cl. C07f 5/06
U.S. Cl. 260—448                                   17 Claims

ABSTRACT OF THE DISCLOSURE

Novel aluminum-aromatic complex compounds of the formula:

$$[Y]^{2-}[AlR^+{}_2]_n[M^+]_m$$

and the ether addition products thereof wherein M designates an alkali metal, Y is a polycyclic aromatic hydrocarbon, R is alkyl, $n$ is 1 or 2, $m$ is 0 or 1, and $n+m=2$ and process for preparing such compounds comprising reacting an alkali metal (M), a polycyclic aromatic hydrocarbon (Y) with an aluminum trialkyl ($AlR_3$) or dialkyl aluminum halide ($R_2AlHal$) or ether addition product thereof.

---

This invention relates to a process for the preparation of new organoaluminum complex compounds.

Addition compounds of alkali metals with polycyclic aromatics such as naphthalene, anthracene, phenanthrene and biphenyl are long known. The process of preparing these addition compounds involves reacting alkali metal and aromatics hydrocarbon in a suitable ether, e.g. in dimethyl ethers, tetrahydrofuran or dimethoxy ethane. In the first reaction stage, the monoanions of the aromatic hydrocarbon are formed:

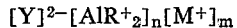

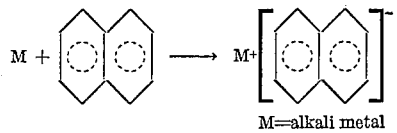

M=alkali metal

Depending upon the ionization energy of the alkali metal and the electron affinity of the hydrocarbon, a dianion may still be formed with further alkali metal:

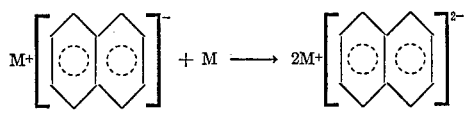

Corresponding compounds of aluminum with aromatic hydrocarbons have not become known heretofore. The direct formation from aluminum metal and aromatics is actually improbable because of the substantially lower electropositive character of aluminum as compared with that of alkali metals. In the field of the reaction products of aromatic hydrocarbons and aluminum, only the conventional organoaluminum compounds, e.g. of the type $AlR_3$ wherein one or more R's represent an aromatic hydrocarbon radical which may also be polycyclic, are known. Compounds of this type have no relation with the present addition compounds as being known for alkali metals with polycyclic aromatics, but unknown up to the present for corresponding addition compounds of aluminum.

The invention relates to a process which permits for the first time the preparation of these novel aluminum-aromatic addition compounds, and that in excellent yields. The compounds of this invention are derivable from the corresponding known alkali metal-aromatic addition compounds of the type $[aromatic]^{2-}\cdot 2M^+$ by replacement of one or both alkali metal ions by the dialkylal cation $[R_2Al]^+$. In place of this cation, use may also be made of its ether adduct $[R_2Al \leftarrow ether]^{-+}$.

In the known reaction of alkali metals with aluminum trialkyls, the corresponding alkali tetraalkyl alanates are formed with separation of aluminum metal:

$$3M + 4AlR_3 \rightarrow 3M[AlR_4] + Al$$

It has now been found surprisingly that this reaction takes an entirely different course if it is allowed to take place in the presence of polycyclic aromatics. If this reaction is carried out, for example, in the presence of naphthalene, in which case it is possible, for example, to operate with tetrahydrofuran as the solvent at 20 to 30° C. or at —40° C. in dimethyl ether, there are formed yellow-brown colored solutions from which (dialkyl aluminum)-naphthalene alkali precipitates as etherate (THF or $Me_2O$) in the form of light yellow crystals. According to the reaction equation, alkali metal tetraalkyl alanate is simultaneously formed:

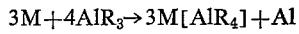

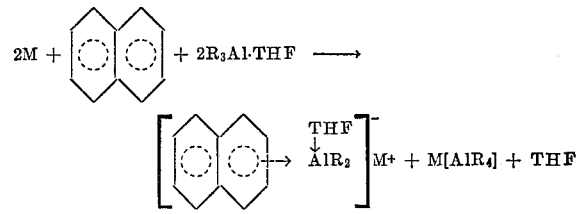

The new addition complex compounds containing aluminum and polycyclic aromatics are producible not only with the use of aluminum trialkyl, it is also possible in one modification of the process to use dialkyl aluminum monohalides as will be shown below.

Accordingly, it is an object of the present invention to provide a process for the preparation of new aluminum-aromatic complex compounds of the general formula $$[Y]^{2-}[AlR^+{}_2]_n[M^+]_m$$

and ether addition products thereof (Y=polycyclic aromatic hydrocarbons; M=alkali metal; $n=1$ or 2, and $m=0$ or 1, and $n+m=2$), the process comprising reacting alkali metal M and polycyclic aromatics Y with aluminum trialkyls ($AlR_3$) or dialkyl aluminum halides ($R_2Al$ Hal) or ether addition products thereof.

Particularly, about two equivalent parts of the alkali metal M are reacted with about one equivalent part of the polycyclic aromatic Y and about 2 equivalent parts $AlR_3$ or $R_2Al$ Hal or ether addition products thereof in the process of the invention.

In accordance with the invention, the reaction of the components is desirably carried out in the presence of ether. It is known that, for the formation of the corresponding alkali metal-aromatic addition compounds, preferred use is made of specific ethers which may also be used advantageously in the process of the invention. Typical examples include tetrahydrofuran, dimethyl ether, diethylether, dimethoxy ethane, diglyme and/or triglyme. However, the new process is not restricted to the use of

these ethers. It can be determined from time to time whether the use of a different ether is particularly desirable. The ether may be introduced into the reaction mixture by using the reactants $R_3Al$ or $R_2AlHal$ in the form of their etherates. However, it is particularly advantageous to carry out the reaction of the invention in an ether solution, i.e. in a liquid ether phase. Just this fact is also to be taken into account when determining the other process conditions for the reaction of this invention.

Thus, it is generally preferred to use temperatures which are at best moderately elevated and desirably do not exceed 100° C. It may be advantageous from time to time to use temperatures below 0° C., e.g. when using methyl ether as the solvent. No lower limit on temperature has been established so far. However, the known fact is to be taken into account that the reaction rate decreases as the temperature decreases. In general, the temperature range of from —50° C. to +40° C. is particularly suitable.

The process of the invention may be carried out at elevated pressures. This may be advantageous especially in cases where readily volatile substances such as dimethyl ether are used to effect conversion of the readily volatile compounds into the liquid phase in addition to, or in place of, liquefaction by cooling.

Suitable alkali metals for the process of the invention are especially lithium, sodium and potassium. The alkali metal is preferably used in the form of lumps. The so-called alkali metal sand may be particularly advantageous.

The R radicals in the aluminum alkyl compounds are preferably straight-chain or branched chain alkyl groups, particularly suitable being radicals with a restricted number of carbon atoms, e.g. containing up to 6 carbon atoms. Typical radicals include methyl, ethyl, propyl and butyl. The corresponding branched-chain radicals may also be used.

When operating in the presence of ether, the ether addition complexes of the new compounds are obtained, the ether being coordinatively linked to aluminum. In accordance with the invention, the new complex compounds may be freed from this ether content. This is desirably effected by decomposition under vacuum, operation under high vacuum having been found to be particularly suitable. The decomposition may be promoted by gentle heating. However, the stability of the addition complex compounds charged and formed must be taken into account.

Starting from the naphthalene-aluminum complex compound of the formula shown above, it is possible, for example, at 40 to 90° C. and $10^{-3}$ mm. Hg to split off the coordinatively linked ether quantitatively. The resultant ether-free compound is deep yellow:

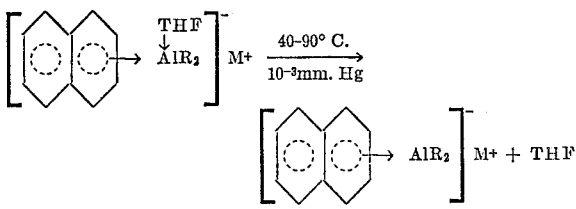

A similar behavior is shown by the new compounds made from other aromatic hydrocarbons, e.g. biphenyl, anthracene, phenanthrene, etc.

The process of the invention permits not only such a conversion of the ether-containing complex compounds into the ether-free complex compounds. It is also possible to prepare addition complexes which contain aluminum and polycyclic aromatics and which, on the one hand, contain additionally alkali metal and, on the other hand, are free thereof. In particular, it is possible to convert in a simple manner the alkail metal-containing complex compounds into the corresponding alkali metal-free compounds.

For this purpose, the alkali metal-aluminum-aromatic complexes may, for example, be reacted with dialkyl aluminum halides to give compounds which contain only aluminum, e.g. according to the following reaction equation:

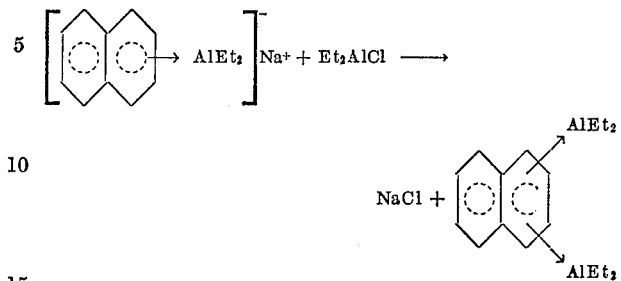

However, the bis-dialkyl-aluminum-naphthalene thus obtained is only stable below 0° C. Above this temperature, it decomposes as does the corresponding bis-phenyl compound with separation of aluminum metal. When operating in ether, the corresponding ether adducts are obtained which are considerably more stable and, for example are entirely stable at room temperature. Thus, here again, it may be advantageous to use an ether as the solvent. The stability of the compounds is variable. Bis-dialkyl-aluminum-anthracene

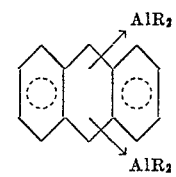

is absolutely stable at room temperature in ether-free state.

Examples of alkali metal-free complex compounds of the invention which have been stabilized by ether adduction include

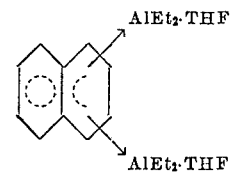

(Yellow liquid, not distillable without decomposition) or

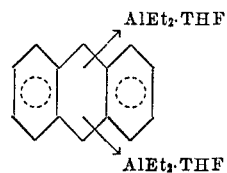

(Yellow crystals, melting point, 116–120° C.)

As was already mentioned, the preparation of the new addition complexes is not restricted to aluminum trialkyl and its etherate. It is also possible to use dialkyl aluminum monohalides. In particular, bis-(dialkyl aluminum)-aromatics can be obtained in the form of their adducts to the corresponding ethers by direct dehalogenation of dialkyl aluminum halides with solutions of the alkali metal-aromatics in suitable ethers according to the following general reaction equation:

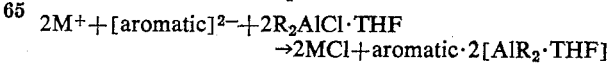

Suitable polycyclic aromatics include the known polynuclear hydrocarbon compounds, e.g. those having up to 6 rings in the molecule. Typical representatives are the readily available aromatic hydrocarbons having 2 or 3 rings such as naphthalene, biphenyl, anthracene or phenanthrene. The new compounds may be used successfully in the field of the chemistry of organoaluminum compounds which has a highly developed status and where they may be used, for example, as valuable components for organometallic mixed catalysts, e.g. for the polymerization of olefins.

As regards the preferred ethers, reference is still made to "E. de Boer, Advances in organometallic chemistry," vol. II, 1904, pp. 117–20 and 126 et seq, Acad. Press New York, London. In addition to the compounds mentioned above, this paper mentions substituted tetrahydrofurans such as alkyltetrahydrofuran, dioxane and its derivatives, the use of which in the process of the invention may also be particularly advantageous.

EXAMPLE 1

In a dry 1,000 ml. flask filled with inert gas, 64 g. naphthalene are dissolved in a mixture of 150 ml. THF and 350 ml. diethyl ether. Then 186 g. $AlEt_3 \cdot THF$ are introduced under inert gas pressure and 23 g. Na in small pieces are dropped into the flask while the reaction mixture is stirred. The Na goes into solution within 4 to 6 hours. During the first hour of the reaction, it is necessary to cool because of the evolution of heat (reaction temperature, 20° C.). After some time, light yellow crystals are precipitated from the yellow-brown colored reaction solution. After the Na is completely dissolved, the mixture is filtered and the yellow crystalline precipitate is washed with little cold diethyl ether until the effluent filtrate has a faintly yellow color. The crystals are then at first dried at 20° C./$10^{-3}$ mm. Hg. Yield: 112 grams (73% of the theoretical yield).

To convert the product into the THF-free compound, it is dried for 24 hours at 90° C./$10^{-3}$ mm. Hg. The amount of THF split off is 26 grams (100% of the theoretical). Yield of THF-free product: 86 grams.

The reaction was applied to the alkali metals Li and K as well as to $AlMe_3$ and $Al(t-Bu)_3$. The yields, properties and analytical data of several reaction products with different alkali metals and different aluminum trialkyls are summarized in Table 1. Some of the ether-free compounds obtained from the etherates (THF, $Me_2O$, etc.) by heating under vacuum of $10^{-3}$ to a maximum of 90° C. are summarized in Table 2.

With all products listed in Tables 1 and 2, 1,2-dihydronaphthalene in addition to a little 1,4-dihydronaphthalene is predominantly formed from the naphthalene moiety on hydrolysis. By oxidation of the products listed on Tables 1 and 2, e.g. in THF solution, with dry $O_2$, only naphthalene is reformed from the naphthalene moiety.

EXAMPLE 2

In a dry 1 liter flask filled with inert gas, 39 g. (218 millimoles) anthracene are suspended in 500 ml. diethyl ether (solubility is poor). Then 82.5 g. (440 millimoles) $AlEt_3 \cdot Et_2O$ are introduced by siphoning and 10.1 g. Na (440 milliatoms) in small pieces are dropped into the reaction mixture which is stirred. The solution assumes a brown-red color and a finely crystalline precipitate is separated after some time. After 20 hours, all of the Na is dissolved. The precipitate is recovered by filtration and washed with ether until the ether running off is colorless. Yield: 37.3 g. The analytical data of the product are exactly identical with those calculated for $$\left[ \text{anthracene} \right]^- Na^+$$
$$AlEt_2 \uparrow Et_2O$$

Analysis.—Na: found, 6.7; calculated, 6.4. Al: found, 7.5; calculated, 7.5.

The yield corresponds to 47% of the theoretical.

By heating to 50–90° C. at $10^{-3}$ mm. Hg, the combined ether is split off. The product is converted quantitavely into the ether-free compound:

$$\left[ \text{anthracene} \right] Na^+ \xrightarrow[10^{-3} mm.Hg]{50-90°C.}$$
$$AlEt_2 \nearrow Et_2O$$

$$\left[ \text{anthracene} \right] Na^+ + Et_2O$$
$$AlEt_2$$

The compound is absolutely insoluble in benzene, hep-

TABLE 1.—REACTION PRODUCTS, PROPERTIES, ANALYTICAL DATA OF ETHER ADDUCTS OF (DIALKYL ALUMINUM) NAPHTHALENE-ALKALI METAL COMPOUNDS

| Reaction product | Yield, percent of theory | Properties | Analytical data, percent | | | | | |
|---|---|---|---|---|---|---|---|---|
| | | | Alkali | | Al | | Alkyl | |
| | | | Found | Calc. | Found | Calc. | Found | Calc. |
| Na+[Napht·AlMe₂·THF]⁻ | 65 | Light yellow crystals, in THF moderately soluble; in Et₂O and benzene very difficultly soluble; M.P. 186° C. (dec.). | 8.3 | 8.23 | 9.45 | 9.65 | 22.8 | 23.0 |
| Na+[Napht·AlEt₂·THF]⁻ | 73 | Light yellow crystals, in THF moderately soluble; in Et₂O and benzene difficultly soluble; M.P. 170° C. (dec.). | 7.9 | 7.5 | 8.7 | 8.75 | 19.0 | 18.8 |
| Na+[Napht·AlEt₂·Me₂O]⁻ | 61 | Light yellow crystals, in ether, benzene, gasoline sparingly soluble. | 8.0 | 8.15 | 9.6 | 9.6 | 20.2 | 20.6 |
| Li+[Napht·AlEt₂·THF]⁻ | 62 | Light yellow crystals, in THF moderately soluble; in Et₂O and benzene sparingly soluble. | 2.15 | 2.37 | 9.1 | 9.25 | 19.6 | 19.8 |
| K+[Napht·AlEt₂·THF]⁻ | 70 | ___do___ | 12.1 | 12.05 | 8.3 | 8.35 | 17.3 | 17.9 |

The products prepared with $Al(_3H_7)_3 \cdot THF$, $Al(C_4H_9)_3 \cdot THF$ are similar.

TABLE 2.—PROPERTIES AND ANALYTICAL DATA OF ETHER-FREE PRODUCTS OF THE TYPE

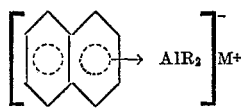

| Product | Properties | Analytical data, percent | | | |
|---|---|---|---|---|---|
| | | Alkali | | Percent Aluminum | |
| | | Found | Calc. | Found | Calc |
| Na+[Napht·AlMe₂]⁻ | Bright yellow crystals; M.P. 189° C. (dec.) | 11.3 | 11.1 | 12.75 | 13.0 |
| Na+[Napht·AlEt₂]⁻ | Dark yellow crystals; M.P. 180° C. (dec.) | 10.0 | 9.8 | 11.3 | 11.45 |
| Li+[Napht·AlEt₂]⁻ | Dark yellow crystals | 3.0 | 3.15 | 12.1 | 12.3 |
| K+[Napht·AlEt₂]⁻ | Dark yellow crystals, at 150° C. dark green; M.P. 180–182° C. | 15.7 | 15.5 | 10.8 | 10.7 | tane, Et$_2$O and does not melt without decomposition. In THF it is soluble with a green color.

Analysis of the ether-free compound.—Found: Na, 7.95; Al, 9.1. Calculated: Na, 8.05; Al, 9.42.

Hydrolysis gives the right amount of 9,10-dihydronaphthalene in addition to ethane (15.7 ml./100 mg.).

EXAMPLE 3

60 g. (167 millimoles) of the compound

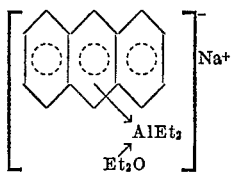

obtained in Example 2 are dissolved in 300 ml. THF and mixed at 0° C. with a solution of 31.2 g.

AlEt$_2$Cl·THF (167 millimoles) in 100 ml. THF which is added dropwise. Upon addition of the first drops, the solution turns yellow to orange and NaCl and an orange precipitate are separated. The aluminum compound is completely dissolved by addition of a total of 1.5 liters THF, separated from the NaCl by filtration and then concentrated to about 200 ml. at 20° C./15 mm. Hg. During the evaporation, yellow crystals are precipitated, the amount of which can be increased by cooling the solution to −10° C. The crystals are recovered by filtration and dried for 2 to 3 hours at 10$^{-3}$ mm. Hg. Yield: 70 g. of a compound melting at 116°–120° C. and having analytical data which are in agreement with those calculated for

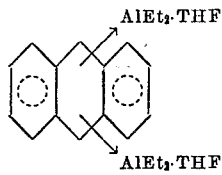

Analysis.—Al: found, 11.03; calculated, 11.0. Et: found, 24.1; calculated, 23.6.

The compound is sparingly soluble in ether and completely insoluble in heptane, hexane or pentane.

EXAMPLE 4

By the procedure described in Example 3, it is possible by reacting 30.8 grams

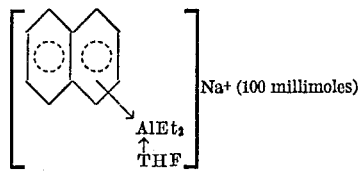

with 19.25 g. AlEt$_2$Cl·THF (100 millimoles) in 150 ml. THF, separation of NaCl by filtration and evaporation of the excess solvent to obtain

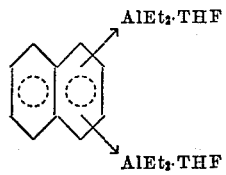

42 g. (95% of the theory) as a deep yellow liquid.

Analysis.—Al: found, 11.9; calculated, 12.2. Et: found, 26.5; calc., 26.3.

Alcoholysis gives the right amount of dihydronaphthalene in addition to ethane, i.e. chiefly 1,2-dihydronaphthalene. Oxidation of a solution of the compound in THF gives only naphthalene from the aromatic moiety.

EXAMPLE 5

The compound described in Example 4 may also be prepared by the following procedure:

3.4 g. of Li chips (490 milliatoms) are stirred with a solution of 31.3 g. naphthalene (245 millimoles) in 400 ml. THF for 8 to 10 hours. Thereafter, the bulk of the lithium (about 60–80%) has dissolved. Then a solution of 95.3 g. (490 mmoles) AlEt$_2$Cl·Et$_2$O in 100 ml. diethyl ether are slowly added dropwise while cooling to 10–20° C. from a dropping funnel kept under an argon stream. After about one half of this amount has been added, the solution brightens (from dark green to yellow). Upon completion of the reaction, all of the solvent (THF and Et$_2$O) is removed at 20° C. and 15 mm. Hg and LiCl precipitates. The residue is taken up in 300 ml. gasoline, separated from LiCl by filtration or centrifuging, and the gasoline is evaporated (20° C./15 mm. Hg). Then the last residues of solvent are removed at 20°–30° C. and 10$^{-3}$ mm. Hg. The compound

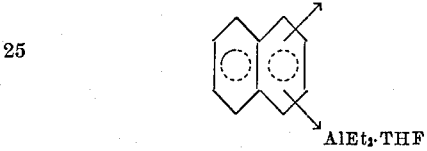

is obtained as a deep yellow, viscous liquid.

Lithium may be replaced by the other alkali metals, i.e. sodium and potassium, and biphenyl, anthracene or, for example, phenanthrene may be used in place of naphthalene. Dimethyl ether, diglyme, triglyme, dimethyl oxyethane, dioxane and, if anthracene is used, diethyl ether have also been found to be suitable solvents in addition to THF.

(Biphenyl)·2[AlEt$_2$·THF] prepared under the conditions of Example 5 has poor stability and, when removing the last portions of solvent, separates aluminum metal according to the reaction equation (biphenyl)·2[AlEt$_2$·THF]→biphenyl
　　　　　　　　　　+1⅓AlEt$_3$·THF+⅔Al+⅔THF

What is claimed is:

1. A compound selected from the group of aluminum-aromatic compounds having the formula:

[Y]$^{2-}$[AlR$^+$$_2$]$_n$[M$^+$]$_m$ and ether addition products thereof, wherein Y represents a polycyclic aromatic hydrocarbon, M represents an alkali metal, R represents alkyl, m is 0 or 1, n is 1 or 2 and m+n=2.

2. A compound according to claim 1 wherein M represents a member selected from the group consisting of sodium, potassium and lithium.

3. A compound according to claim 1 wherein Y represents a polycyclic aromatic hydrocarbon having from 2 to 6 rings.

4. A compound according to claim 1 wherein said ether is a member selected from the group consisting of tetrahydrofuran, dimethyl ether, diethyl ether, dimethoxy ethane, diglyme and triglyme.

5. A compound according to claim 1 having the formula

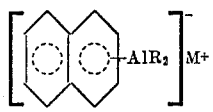

wherein R and M are as above defined.

6. A compound according to claim 5 in the form of its etherate.

7. A compound according to claim 1 having the formula:

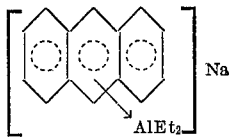

8. A compound according to claim 1 having the formula:

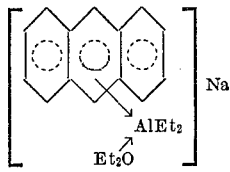

9. A compound selected from the group consisting of bis dialkyl aluminum polycyclic aromatic hydrocarbons having the formula:

$$Y^{2-}(AlR_2^+)_2$$

and the etherates thereof wherein Y is a polycyclic aromatic hydrocarbon and R is alkyl.

10. A compound according to claim 9 having the formula:

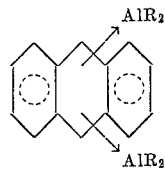

wherein R is as above defined.

11. A compound according to claim 9 having the formula:

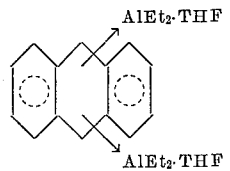

12. A compound according to claim 9 having the formula:

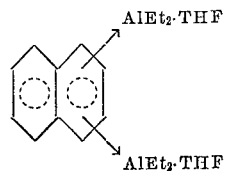

13. Process for preparing a compound according to claim 1 having the formula:

$$[Y]^2[AlR_2^+]_n[M^+]_m$$

in the form of its etherate wherein Y, R, n, M and m are as above defined which comprises reacting an alkali metal (M) and a polycyclic aromatic hydrocarbon (Y) with an aluminum trialkyl or dialkyl aluminum halide in the presence of an ether.

14. Process for preparing a compound according to claim 1 having the formula:

$$[Y]^2[AlR_2^+]_n[M^+]_m$$

in the form of its etherate, wherein R, n, M and m are as above defined which comprises reacting an alkali metal (M) and a polycyclic aromatic hydrocarbon with an aluminum trialkyl etherate or dialkyl aluminum halide etherate.

15. Process according to claim 13 which comprises reacting said components in an amount of 2 equivalent parts of alkali metal, 1 equivalent part of polycyclic aromatic hydrocarbon and 2 equivalent parts of aluminum compound.

16. Process according to claim 13 which comprises conducting said reaction at a temperature of from —50 to 100° C.

17. Process according to claim 13 which comprises the additional step of reacting said compound $$Y^2-AlR_2^+M^+$$

with an equivalent amount of a dialkyl aluminum halide and recovering the compound $Y^{2-}(AlR_2^+)_2$ thereby formed.

References Cited

UNITED STATES PATENTS

| | | |
|---|---|---|
| 3,206,522 | 9/1965 | Poe et al. |
| 3,280,025 | 10/1966 | Poe et al. |
| 3,328,446 | 6/1967 | Poe et al. |
| 3,341,562 | 9/1967 | Lehmkuhl et al. |
| 3,376,331 | 4/1968 | Kroll. |

OTHER REFERENCES

Surtees: Reviews of Pure and Applied Chemistry, vol. 13, pp. 99–100 (1963) (QD–1–R6).

Seyferth et al.: Annual Surveys of Organometallic Chemistry, vol. 1, pp. 76–83 (1965) (QD–411–S48) (corresponds to C.A., vol. 60, p. 12,050 (1964).

Nesmayanov et al.: Methods of Elements Org. Chem., vol. pp. 400–401 (1967) QD–411–N37–C. 2) corresponds to Bull. Soc. Chim., France, p. 1044 (1950).

TOBIAS E. LEVOW, Primary Examiner

H. M. S. SNEED, Assistant Examiner

U.S. Cl. X.R.

252—431; 260—346.1, 93.7

UNITED STATES PATENT OFFICE
CERTIFICATE OF CORRECTION

Patent No. 3,470,224   Dated Sept. 30, 1969

Inventor(s) HERBERT LEHMKUHL

It is certified that error appears in the above-identified patent and that said Letters Patent are hereby corrected as shown below:

Col. 2, line 11, "$[R_2Al \leftarrow ether]^{-+}$" should be --$[R_2Al \leftarrow ether]^{+}$--; columns 5-6, in Table 1, under the heading "Properties", 2nd item, "M.P. $170°C.(dec.)$." should be --M.P. $>170°C.(dec.)$.--; columns 5-6, in the footnote at the end of Table 1, "$Al(_3H_7)_3 \cdot THF$" should be --$Al(C_3H_7)_3 \cdot THF$-- column 6, in the last heading "Percent Aluminum" should be --Aluminum--; column 6, line 29, "quantitavely" should be --quantitatively--; column 8, line 17, "300 ml." should be --500 ml.--column 10, line 46, "pp. 76-83" should be --pp. 76-8; column 10, line 48, "Methods of Elements Org. Chem.," should be --Methods of Elemento Org. Chem.,--

SIGNED AND
SEALED
MAY 19 1970

(SEAL)
Attest:

Edward M. Fletcher, Jr.
Attesting Officer

WILLIAM E. SCHUYLER, JR.
Commissioner of Patents